(12) United States Patent
Yang et al.

(10) Patent No.: US 11,010,063 B2
(45) Date of Patent: May 18, 2021

(54) HIGH-TEMPERATURE PROTECTION METHOD FOR SOLID STATE DRIVE AND IMPLEMENTATION DEVICE THEREOF

(71) Applicant: Chengdu University of Information technology, Sichuan (CN)

(72) Inventors: Yan Yang, Sichuan (CN); Jianxiong Zhao, Sichuan (CN)

(73) Assignee: Chengdu University of Information technology, Sichuan (CN)

( * ) Notice: Subject to any disclaimer, the term of this patent is extended or adjusted under 35 U.S.C. 154(b) by 170 days.

(21) Appl. No.: 16/216,886

(22) Filed: Dec. 11, 2018

(65) Prior Publication Data

US 2019/0138224 A1    May 9, 2019

(51) Int. Cl.
     *G06F 12/00*      (2006.01)
     *G06F 3/06*      (2006.01)
     *G06F 1/20*      (2006.01)

(52) U.S. Cl.
     CPC .......... *G06F 3/0614* (2013.01); *G06F 1/206* (2013.01); *G06F 3/0653* (2013.01); *G06F 3/0679* (2013.01)

(58) Field of Classification Search
     CPC ...... G06F 3/0614; G06F 1/206; G06F 3/0653; G06F 3/0679
     See application file for complete search history.

(56) References Cited

U.S. PATENT DOCUMENTS 9,811,267 B1 * 11/2017 Yang .................... G06F 3/0688
10,115,437 B1 * 10/2018 Yuan ..................... G11C 5/005
2005/0245839 A1 * 11/2005 Stivoric ................. G01K 1/024
     600/549
2011/0205823 A1 * 8/2011 Hemink ................. G11C 16/26
     365/211
2013/0080679 A1 * 3/2013 Bert ..................... G06F 12/0866
     711/102

(Continued)

OTHER PUBLICATIONS http://www.allaboutcircuits.com:80/worksheets/analog-to-digital-conversion/ (Year: 2016).*

(Continued)

*Primary Examiner* — Mano Padmanabhan
*Assistant Examiner* — Mohammad S Hasan (57) ABSTRACT

A high-temperature protection method for a solid state drive (SSD) and an implementation device thereof are provided. The device includes a temperature measurement circuit, a host communication interface, a SSD main controller and NAND Flash storage medium chips, wherein the SSD main controller is for controlling data transmission and command interaction between a host and the NAND Flash storage medium chips, including a SATA/PCIe (serial advanced technology attachment/peripheral component interconnect express) physical controller, a high-temperature control manager, a main controller core, a RAM (random access memory) and a NAND Flash controller. Through embedding the high-temperature control manager in the SSD main controller, a latency value of a NAND Flash business command, namely a speed-limiting value, is generated according to relationships between temperature information and an initial temperature threshold of the SSD and then transmitted to the main controller core, thereby improving reliability of the SSD.

10 Claims, 4 Drawing Sheets

(56) References Cited

U.S. PATENT DOCUMENTS

| | | | |
|---|---|---|---|
| 2014/0233132 A1* | 8/2014 | Budiman | G11B 5/5565 360/69 |
| 2015/0220278 A1* | 8/2015 | Sarcone | G06F 3/061 711/103 |
| 2018/0003572 A1* | 1/2018 | Garsd | G01K 3/14 |
| 2018/0260007 A1* | 9/2018 | Ping | H05K 7/20836 |
| 2019/0043596 A1* | 2/2019 | Madraswala | G11C 16/26 |
| 2019/0221253 A1* | 7/2019 | Gherman | G11C 7/04 |
| 2019/0313907 A1* | 10/2019 | Khachaturian | A61B 5/02416 |

OTHER PUBLICATIONS https://web.archive.org/web/20171215214705/https://en.wikipedia.org/wiki/Timer (Year: 2017).*

* cited by examiner

HIGH-TEMPERATURE PROTECTION METHOD FOR SOLID STATE DRIVE AND IMPLEMENTATION DEVICE THEREOF

CROSS REFERENCE OF RELATED APPLICATION

The application claims priority under 35 U.S.C. 119(a-d) to CN 201711420007.9 and CN 201711420029.5, filed Dec. 15, 2017.

BACKGROUND OF THE PRESENT INVENTION

Field of Invention

The present invention relates to a technical field of electronic memory, and more particularly to a high-temperature protection method for a solid state drive and an implementation device thereof.

Description of Related Arts

With the continuous development of the electronic information technology, the big data storage requirement continuously drives the flash memory to rapidly develop towards faster speed, higher density and higher reliability. The solid state drive (SSD) is a nonvolatile storage device, which has characteristics of fast data read-write speed, large storage capacity, and high reliability and is able to meet the data storage requirement in all industries. The common SSD adopts a NAND Flash as the storage medium, which has advantages of fast assess speed and large storage capacity and is widely applied in the military, consumption, and monitoring fields. The SSD comprises a host communication interface, a SSD main controller, and a NAND Flash storage medium, wherein: the host communication interface as the communication interface between the host and the SSD completes the functions of command interaction and data transmission; the common host communication interface of the SSD has types of SATA (serial advanced technology attachment), SAS (serial attached SCSI), PCIe (peripheral component interconnect express) and so on; the SSD main controller is for realizing the functions of data relay between the host and the NAND Flash storage medium and internal data management; the NAND Flash storage medium realizes the data storage, and the actual performance of the NAND Flash storage medium directly restricts the overall performance of the SSD.

With the more and more complex application scene of the SSD, when the working environment temperature of the SSD is higher than 70° C., considering the own power consumption of the SSD, the temperature of the SSD may exceed the processing upper limit temperature of the SSD main controller or the NAND Flash storage medium, causing the abnormal operation of the SSD, and even the loss of the user data or the physical damage of the SSD. The temperature of the SSD is mainly related to the working environment temperature and the own power consumption of the SSD. The working environment temperature of the SSD is set by the user, and the specific value thereof is uncontrollable; in order to ensure the normal operation of the SSD in the high-temperature environment, the own power consumption of the SSD is required to be adjusted, so as to enable the temperature of the SSD not to exceed the processing upper limit temperature. The own power consumption of the SSD is mainly related to the performance of the SSD, so that the adjustment of the SSD power consumption is namely the adjustment of the SSD performance.

The performance of the SSD is reflected in the host bandwidth, IOPS (input/output operations per second), and host command response time, which are mainly controlled by the host communication interface, the NAND Flash controller command concurrency, and the performance of the NAND Flash storage medium. The conventional method for realizing adjustment of the SSD performance is to physically arrange a cooling fin or cooling fan. However, the non-quantitative method has the limited practical effect and the limited adjustment ability for the SSD power consumption.

SUMMARY OF THE PRESENT INVENTION

For above problems, an object of the present invention is to provide a high-temperature protection method for a solid state drive (SSD) and an implementation device thereof, so as to solve the technical problem of high reliability of the SSD in a high-temperature environment, guarantee that the SSD is able to normally and highly-efficiently work in the high-temperature environment, improve reliability of the SSD, and realize wider application.

In order to accomplish the above object and solve the technical bottleneck of the conventional SSD in the high-temperature environment, the present invention provides a high-temperature protection SSD, comprising a temperature measurement circuit, a host communication interface, a SSD main controller and NAND Flash storage medium chips, wherein:

the host communication interface is connected to the SSD main controller and communicates with a host, so as to complete data transmission and command interaction between the host and the SSD main controller;

the temperature measurement circuit is connected to the SSD main controller, for collecting a temperature physical signal and receiving a sampled signal from the SSD main controller; after receiving the sampled signal, the temperature measurement circuit converts the temperature physical signal to temperature information and transmits to the SSD main controller;

the SSD main controller is connected to the host communication interface, the temperature measurement circuit and the NAND Flash storage medium chips, for controlling data transmission and command interaction from the host to the NAND Flash storage medium chips; the SSD main controller comprises a SATA/PCIe (serial advanced technology attachment/peripheral component interconnect express) physical controller, a high-temperature control manager, a main controller core, a RAM (random access memory) and a NAND Flash controller;

the NAND Flash storage medium chips are connected to the SSD main controller, for providing storage space and access interfaces for business operations of the SSD and completing internal data storage of the host or the SSD;

the SATA/PCIe physical controller is connected to the host communication interface, for receiving commands and data from the host and then distributing to the main controller core, replying to the host commands, and transmitting data to the host;

the high-temperature control manager is connected to the temperature measurement circuit and the main controller core, for transmitting the sampled signal to the temperature measurement circuit, receiving the temperature information provided by the temperature measurement circuit, setting an initial temperature threshold, generating a latency value of a NAND Flash business command according to relationships between the temperature information and the initial temperature threshold, which is namely a speed-limiting value, and transmitting the speed-limiting value to the main controller core;

the main controller core is connected to the SATA/PCIe physical controller, the high-temperature control manager, the RAM, and the NAND Flash controller, for controlling the SATA/PCIe physical controller, the high-temperature control manager, the RAM and the NAND Flash controller to operate according to a logic business of the SSD, and configuring the speed-limiting value to the NAND Flash controller;

the RAM is connected to the main controller core, the SATA/PCIe physical controller, and the NAND Flash controller, for caching the data from the host and the internal data from the SSD; and the NAND Flash controller is connected to the main controller core, for receiving a business requirement command from the main controller core and completing reading, writing, erasing and non-data command operations to the NAND Flash storage medium chips.

Preferably, the temperature measurement circuit comprises:

a temperature sensor, which is connected to a temperature conversion circuit, for collecting the temperature physical signal and transmitting to the temperature conversion circuit;

the temperature conversion circuit, which is connected to the temperature sensor and an analog-digital converter, for receiving the temperature physical signal from the temperature sensor, converting to an electric signal, and transmitting to the analog-digital converter;

the analog-digital converter, which is connected to the high-temperature control manager, the temperature conversion circuit, and a data register, for converting the electric signal to the temperature information and transmitting to the data register, and further for receiving a control signal and a clock signal from the high-temperature control manager, wherein the control signal is the sampled signal provided by a timing trigger module; and the clock signal is provided by a clock source inside the SSD main controller;

the data register, which is connected to the analog-digital converter and an internal data reading interface, for receiving the temperature information outputted by the analog-digital converter and then storing, and further for providing a data source for the internal data reading interface; and the internal data reading interface, which is connected to the data register and the high-temperature control manager, for providing a data reading interface for the high-temperature control manager and taking the temperature information out of the data register when the high-temperature control manager requires reading the temperature information.

Preferably, the high-temperature control manager comprises:

the timing trigger module, which is connected to the temperature measurement circuit and a high-temperature speed-limiting control module, for setting a timing period t1 after powering on, receiving a start timing signal from the high-temperature speed-limiting control module, and periodically transmitting the sampled signals to the temperature measurement circuit and the high-temperature speed-limiting control module with the timing period of t1 under triggering of the start timing signal;

a temperature access module, which is connected to the temperature measurement circuit and the high-temperature speed-limiting control module, for receiving the temperature information from the temperature measurement circuit and storing in an internal register;

the high-temperature speed-limiting control module, which is connected to the temperature access module, the timing trigger module, a high-temperature speed-limiting value generator module, and the main controller core, for periodically transmitting the start timing signal to the timing trigger module, acquiring the temperature information from the temperature access module, configuring the initial temperature threshold, completing analysis of the temperature information, and judging whether the temperature information is required to be transmitted to the high-temperature speed-limiting value generator module according to analysis results, and further for transmitting the latency value provided by the high-temperature speed-limiting value generator module to the main controller core; and the high-temperature speed-limiting value generator module, which is connected to the high-temperature speed-limiting control module, for receiving the temperature information from the high-temperature speed-limiting control module, completing power consumption and performance analysis of the SSD according to the temperature information, and generating the latency value of the corresponding NAND Flash business command.

Preferably, the high-temperature speed-limiting control module comprises:

a start signal generator, which is connected to the timing trigger module and a temperature collection counter, for generating the start timing signal and transmitting to the timing trigger module, receiving the sampled signals from the timing trigger module and then transmitting to the temperature collection counter;

the temperature collection counter, which is connected to the start signal generator and a temperature pre-analyzer, for receiving the sampled signals transmitted from the start signal generator, counting, and transmitting to the temperature pre-analyzer;

a temperature reading controller, which is connected to the temperature access module and a temperature validity detector, for acquiring the temperature information from the temperature access module and then transmitting the temperature information to the temperature validity detector;

the temperature validity detector, which is connected to the temperature reading controller and the temperature pre-analyzer, for receiving the temperature information from the temperature reading controller, detecting validity of the temperature information, discarding invalid temperature information, and transmitting valid temperature information to the temperature pre-analyzer;

the temperature pre-analyzer, which is connected to the temperature collection counter, the temperature validity detector and a speed-limiting control module, for receiving a counting value transmitted from the temperature collection counter and the current valid temperature information, and identifying validity thereof; wherein: if one of the counting value and the temperature information is invalid, the current collected information is discarded; if both are valid, both of the counting value and the temperature information are transmitted to the speed-limiting control module;

the speed-limiting control module, which is connected to the temperature pre-analyzer, a temperature pushing module, a speed-limiting value validity detecting module and the main controller core, for configuring the initial temperature threshold after powering on, receiving the current valid temperature information and counting value, and judging whether another speed-limiting value is required to be generated according to a current speed-limiting value;

wherein: if required, the current temperature information and counting value are encapsulated and transmitted to the temperature pushing module; otherwise, the current temperature information is discarded; the speed-limiting control module is further for receiving a latest valid speed-limiting value from the speed-limiting value validity detecting module, setting as a latest speed-limiting value of the corresponding business command, transmitting to the main controller core, and adjusting the corresponding business to use the latest speed-limiting value; "judging whether another speed-limiting value is required to be generated" particularly comprises steps of: according to the counting value, judging whether the timing trigger module normally works; if the timing trigger module normally works, determining the speed-limiting value according to the current temperature information and the initial temperature threshold, wherein:

an actual operation time of reading to the NAND Flash storage medium chips is Cread=(T1−T2)*Cr4+Cr1; an actual operation time of programming to the NAND Flash storage medium chips is Cwrite=(T1−T2)*Cw4+Cw1; a first temperature T1 of the SSD is the temperature information acquired by the temperature measurement circuit; a second temperature T2 of the SSD is the initial temperature threshold set according to a working environment temperature of the SSD; Cr1 is a basic operation time of reading to the NAND Flash storage medium chips; Cw1 is a basic operation time of programming to the NAND Flash storage medium chips; Cr4 is an average operation time change value of a NAND Flash reading command caused by a temperature change of every degree centigrade; Cw4 is an average operation time change value of a NAND Flash programming command caused by the temperature change of every degree centigrade; if the timing trigger module does not normally work, the speed-limiting value is Cr1 or Cw1;

the temperature pushing module, which is connected to the speed-limiting control module and the high-temperature speed-limiting value generator module, for receiving the current temperature information from the speed-limiting control module and transmitting to the high-temperature speed-limiting value generator module;

a speed-limiting value pushing module, which is connected to the speed-limiting value validity detecting module and the high-temperature speed-limiting value generator module, for receiving the current speed-limiting value from the high-temperature speed-limiting value generator module and transmitting to the speed-limiting value validity detecting module;

the speed-limiting value validity detecting module, which is connected to the speed-limiting control module, the speed-limiting value pushing module and a channel control module, for detecting the current speed-limiting value through judging whether the current speed-limiting value exceeds a set threshold; wherein: if exceeding the set threshold, the channel control module is informed to limit a channel number, and the SSD uses the last speed-limiting value; otherwise, the current speed-limiting value is transmitted to the speed-limiting control module; and the channel control module, which is connected to the speed-limiting value validity detecting module, for gradually decreasing a concurrent channel number of the NAND Flash storage medium chips when the speed-limiting value exceeds the set threshold.

Preferably, the NAND Flash controller comprises four independent business channels; and each channel is able to hook targets of eight NAND Flash storage medium chips.

The present invention further provides a high-temperature protection method for a SSD, comprising steps of:

(1), after powering on, setting a timing period t1 by a timing trigger module; configuring an initial temperature threshold of the SSD by a speed-limiting control module; and, generating a start timing signal and then transmitting to the timing trigger module by a start signal generator;

(2), after receiving the start timing signal transmitted from a high-temperature speed-limiting control module by the timing trigger module, with the timing period of t1, periodically transmitting a sampled signal to a temperature measurement circuit;

(3), after receiving the sampled signal by the temperature measurement circuit, starting measuring temperature information of the SSD;

(4), with a time interval of t1, periodically acquiring the temperature information of the SSD from the temperature measurement circuit by a temperature access module;

(5), receiving the temperature information of the SSD from the temperature access module by the high-temperature speed-limiting control module, comparing with the set initial temperature threshold, and calculating a difference; and (6), according to relationships between the temperature information of the SSD and the set initial temperature threshold that Xr=(current actual temperature−initial temperature threshold)*(Crmax−Cr1)/(upper limit temperature−initial temperature threshold)+Cr1 and Xw=(current actual temperature−initial temperature threshold)*(Cwmax−Cw1)/(upper limit temperature−initial temperature threshold)+Cw1, driving a high-temperature speed-limiting value generator module to generate a latency value of a NAND Flash business command and transmitting to a main controller core by the high-temperature speed-limiting control module; configuring the latency value to a NAND Flash controller by the main controller core, and adjusting a bandwidth of the SSD; wherein: Crmax represents a maximum operation time of a NAND Flash reading command; Cwmax represents a maximum operation time of a NAND Flash programming command; Xr represents a latency value of the NAND Flash reading command; and Xw represents a latency value of the NAND Flash programming command.

Preferably, the step (3) particularly comprises steps of:

(3.1), collecting a temperature physical signal of the SSD by a temperature sensor;

(3.2), converting the temperature physical signal of the SSD to an electric signal by a temperature conversion circuit;

s (3.3), converting the electric signal to the temperature information and transmitting to a data register by an analog-digital converter; and (3.4), storing the temperature information by the data register.

Preferably, after receiving the temperature information of the SSD from the temperature access module, the step (5) further comprises steps of:

detecting validity of the temperature information through a temperature validity detector, and discarding invalid temperature information; and acquiring a counting value of the sampled signals and the current valid temperature information through a temperature pre-analyzer, and identifying validity thereof; if one of the counting value and the temperature information is invalid, discarding the current collected information; if both are valid, transmitting both of the counting value and the temperature information to the speed-limiting control module.

Preferably, the step of "adjusting a bandwidth of the SSD" in the step (6) particularly comprises steps of: adjusting a command concurrent channel number in the NAND Flash controller, and adjusting a data throughput rate of a NAND Flash interface; wherein:

the command concurrent channel number in the NAND Flash controller is adjusted through steps of: according to the current actual temperature of the SSD, when a high-temperature control manager judges that the current actual temperature of the SSD is higher than a processing upper limit temperature of a SSD main controller, not changing a speed-limiting value and meanwhile decreasing the concurrent channel number in the NAND Flash controller; otherwise, not changing the concurrent channel number in the NAND Flash controller; and the data throughput rate of the NAND Flash interface is adjusted through steps of: when the actual temperature of the SSD is higher than the set initial temperature threshold and meanwhile higher than a SSD temperature value of a last period, decreasing the data throughput rate of the NAND Flash interface; when the actual temperature of the SSD is higher than the initial temperature threshold but lower than the SSD temperature value of the last period, increasing the data throughput rate of the NAND Flash interface, thereby guaranteeing performance of the SSD; and when the actual temperature of the SSD is lower than the initial temperature threshold, recovering to a default data throughput rate of the NAND Flash interface.

Further preferably, the data throughput rate of the NAND Flash interface is adjusted through adjusting an operation time of the NAND Flash reading or programming command, namely adjusting a NAND Flash latency value, comprising steps of:

when a first temperature T1 of the SSD increases to a third temperature T3 of the SSD, setting the maximum operation time Crmax of the NAND Flash reading command and the maximum operation time Cwmax of the NAND Flash programming command; wherein: the first temperature T1 of the SSD is the temperature information acquired by the temperature measurement circuit; and the third temperature T3 of the SSD is an upper limit temperature of the SSD;

calculating a third reading time Cr3 and a third programming time Cw3 to NAND Flash storage medium chips through formulas of Cr3=Crmax−Cr1 and Cw3=Cwmax−Cw1;

calculating a difference of an actual temperature range of the SSD, namely a first temperature difference T4 of the SSD, through a formula of T4=T3−T2; wherein the second temperature T2 of the SSD is the initial temperature threshold set according to a working environment temperature of the SSD;

calculating average operation time change values of the NAND Flash commands caused by a temperature change of every degree centigrade, respectively denoted as a fourth reading period Cr4 and a fourth programming period Cw4 to the NAND Flash storage medium chips, namely:

$$Cr4=Cr3/T4=Cr3/(T3-T2);$$

$$Cw4=Cw3/T4=Cw3/(T3-T2);$$

if T1 is larger than or equal to T2, starting adjusting the bandwidth of the SSD, calculating a difference between T and T2, and acquiring a business type of a current operation to the NAND Flash storage medium chips, wherein the business type comprises a programming business and a reading business; combined with Cr4 and Cw4, respectively obtaining actual operation times of the NAND Flash reading and programming commands; wherein: if the current operation is a reading command, the actual operation time of reading to the NAND Flash storage medium chips is:

$$Cread=(T1-T2)*Cr4+Cr1;$$

if the current operation is a programming command, the actual operation time of programming to the NAND Flash storage medium chips is:

$$Cwrite=(T1-T2)*Cw4+Cw1;$$

if T1 is smaller than T2, stopping adjusting the bandwidth of the SSD, and adopting a basic operation time as the operation time of the NAND Flash reading or programming command, wherein: the actual operation time of reading to the NAND Flash storage medium chips is Cread=Cr1; and the actual operation time of programming to the NAND Flash storage medium chips is Cwrite=Cw1.

According to the present invention, through embedding the high-temperature control manager in the SSD main controller and embedding the temperature sensor and the temperature measurement circuit in the SSD, the own power consumption of the SSD is monitored and adjusted (namely adjusting the latency value of the NAND Flash command according to an actual condition of the SSD; if a limiting case happens, namely the SSD temperature reaches an uncontrollable condition, using the channel number control technology of the NAND Flash controller), so as to improve the reliability of the SSD in the high-temperature environment with considering the performance of the SSD, and ensuring that the SSD reliably and highly-efficiently works in the high-temperature environment.

DETAILED DESCRIPTION OF THE PREFERRED EMBODIMENT

In order to make objects, technical solutions and advantages of the present invention more clearly, the present invention is further described in detail with the accompanying drawings and the preferred embodiment. It should be understood that the preferred embodiment described herein is merely for explaining the present invention, not for limiting the present invention.

Figure 1:
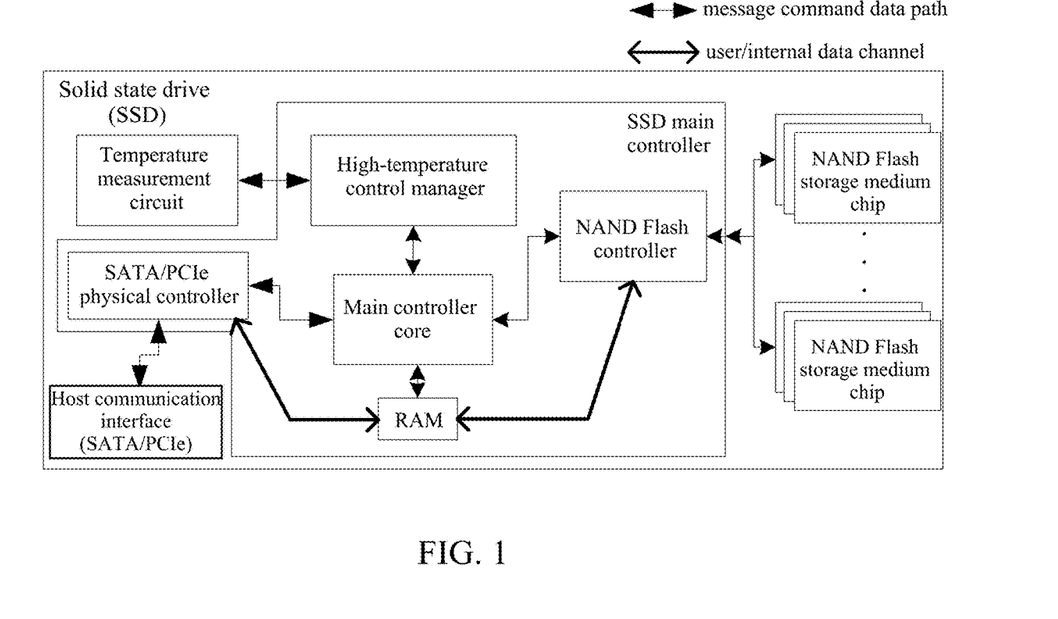
FIG. 1 is a structural sketch view of a solid state drive (SSD) with a high-temperature control manager according to a preferred embodiment of the present invention.

Referring to FIG. 1, according to the preferred embodiment of the present invention, a high-temperature protection solid state drive (SSD) is provided, so as to improve reliability of the SSD in a high-temperature environment. The SSD comprises a temperature measurement circuit, a host communication interface, a SSD main controller and NAND Flash storage medium chips. Besides realizing conventional SSD businesses, such as host reading, host writing and command managing, the SSD further realizes actual temperature measurement of the SSD and is able to automatically adjust a power consumption of the SSD according to measurement results, so as to improve the reliability of the SSD in the high-temperature environment. The host communication interface is able to support a SATA (serial advanced technology attachment) or PCIe (peripheral component interconnect express) interface and communicates with a host, so as to complete functions of data transmission and command interaction between the host and the SSD. A temperature sensor is for collecting a temperature physical signal and transmitting to the temperature measurement circuit. The temperature sensor is made of special material, which has a relatively good effect in application scene, long life and temperature value accuracy. The temperature measurement circuit is for receiving a sampled signal from the SSD main controller, converting the temperature physical signal at the temperature sensor to an electric signal, and transmitting to a high-temperature control manager of the SSD main controller. The SSD main controller is for controlling command interaction and data interaction from the host to the NAND Flash storage medium chips, comprising a SATA/PCIe (serial advanced technology attachment/peripheral component interconnect express) physical controller, the high-temperature control manager, a main controller core, a RAM (random access memory) and a NAND Flash controller. The NAND Flash storage medium chips are for providing storage space and access interfaces for business operations of the SSD and completing internal data storage of the host or the SSD.

The SSD main controller comprises:

the SATA/PCIe physical controller, for receiving commands and data from the host and then distributing to the main controller core, replying to the host commands, and transmitting data to the host;

the high-temperature control manager, for transmitting the sampled signal to the temperature measurement circuit, receiving temperature information provided by the temperature measurement circuit, setting an initial temperature threshold, generating a latency value of a NAND Flash business command according to relationships between the temperature information and the initial temperature threshold, and transmitting the latency value to the main controller core (wherein: the latency value is equivalent to a speed-limiting value; the latency value aims at the NAND Flash storage medium chips; and the speed-limiting value aims at the SSD);

the main controller core, for controlling the SATA/PCIe physical controller, the high-temperature control manager, the RAM and the NAND Flash controller to operate according to a logic business of the SSD and configuring the latency value to the NAND Flash controller;

the RAM, for caching the data from the host and the internal data from the SSD, such as a mapping relationship between LBA (logical block address) and PBA (physical block address); and the NAND Flash controller, for receiving a business command from the main controller core and completing reading, writing, erasing and non-data command operations to the NAND Flash storage medium chips, wherein: the NAND Flash controller comprises multiple independent business channels; and each channel is able to hook targets of eight NAND Flash storage medium chips.

One target of the NAND Flash storage medium chip is an access target, and multiple die can be encapsulated therein; one target corresponds to one chip enable signal or one read/busy signal and is able to be independently used for controlling other control signals and data bus.

Figure 2:
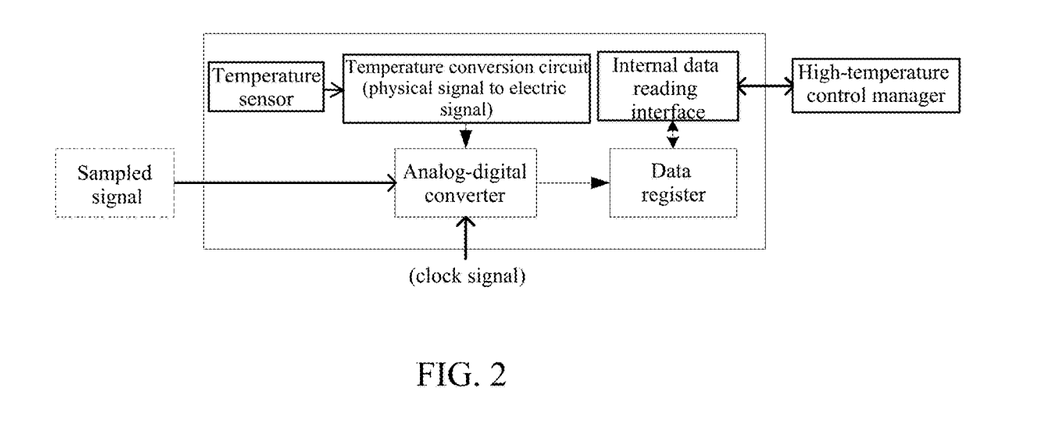
FIG. 2 is an internal structural sketch view of a temperature measurement circuit according to the preferred embodiment of the present invention.

Referring to FIG. 2, the temperature measurement circuit of the high-temperature protection SSD comprises:

a temperature conversion circuit, for receiving the temperature physical signal from the temperature sensor, converting to the electric signal, and transmitting to an analog-digital converter;

the analog-digital converter, which is connected to the high-temperature control manager, the temperature conversion circuit, and a data register, for converting the electric signal to the temperature information and transmitting to the data register, and further for receiving a control signal and a clock signal from the high-temperature control manager, wherein: the control signal is the sampled signal provided by a timing trigger module; and the clock signal is provided by a clock source inside the SSD main controller;

the data register, which is connected to the analog-digital converter and an internal data reading interface, for receiving the temperature information outputted by the analog-digital converter and then storing, and further for providing a data source for the internal data reading interface; and the internal data reading interface, for providing an interface for data reading of the high-temperature control manager and taking the temperature information out of the data register.

Figure 3:
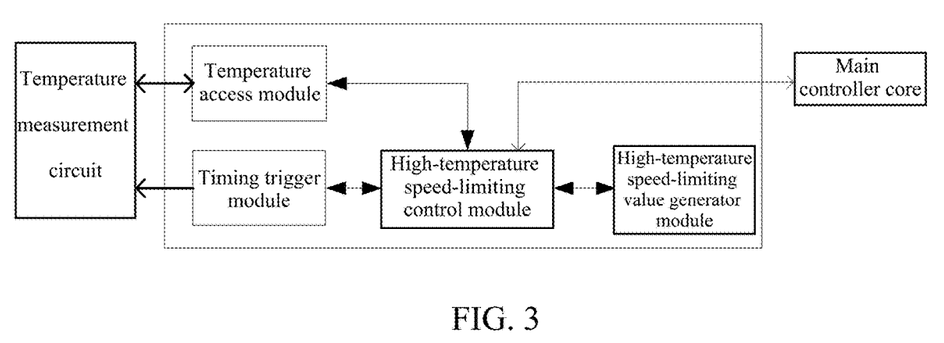
FIG. 3 is an internal structural sketch view of the high-temperature control manager according to the preferred embodiment of the present invention.

Referring to FIG. 3, the high-temperature control manager of the high-temperature protection SSD comprises:

the timing trigger module, for receiving a start timing signal (for starting the timing trigger module to time) transmitted from a high-temperature speed-limiting control module, setting t1 as a timing period under the effect of the start timing signal, and periodically transmitting the sampled signals to the temperature measurement circuit and the high-temperature speed-limiting control module as the sampled signal of the temperature measurement circuit;

a temperature access module, for receiving the temperature information from the temperature measurement circuit and storing in an internal register; wherein the high-temperature speed-limiting control module will take the temperature information out of the temperature access module according to actual business requirements;

the high-temperature speed-limiting control module, for periodically transmitting the start timing signal to the timing trigger module according to the actual business requirements, acquiring the temperature information from the temperature access module, configuring the initial temperature threshold, completing analysis of the temperature information, and judging whether the temperature information is required to be transmitted to a high-temperature speed-limiting value generator module according to analysis results, and further for transmitting the latency value provided by the high-temperature speed-limiting value generator module to the main controller core; and the high-temperature speed-limiting value generator module, for receiving the temperature information from the high-temperature speed-limiting control module, completing power consumption and performance analysis of the SSD according to the temperature information, and generating the latency value of the corresponding NAND Flash business command (for example, a reading command latency value tR means a required time of reading data from Array to cache register by the NAND Flash storage medium chip).

Figure 4:
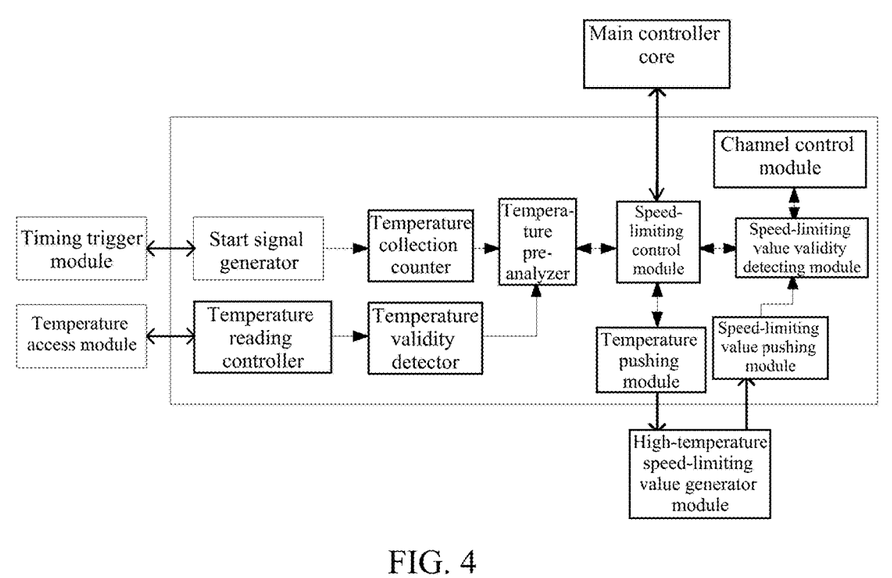
FIG. 4 is an internal structural sketch view of a high-temperature speed-limiting control module according to the preferred embodiment of the present invention.

Referring to FIG. 4, the high-temperature speed-limiting control module in the high-temperature control manager of the high-temperature protection SSD comprises:

a start signal generator, for generating the start timing signal and transmitting to the timing trigger module, receiving the sampled signals from the timing trigger module and then transmitting to a temperature collection counter;

the temperature collection counter, for receiving the sampled signals transmitted to from the start signal generator, counting, and transmitting a counting value to a temperature pre-analyzer; wherein the counting value has an assistant effect in temperature pre-analysis and speed-limiting value acquirement, and enables the temperature value obtained in unit time to be more accurate;

a temperature reading controller, for acquiring the temperature information from the temperature access module and then transmitting the temperature information to a temperature validity detector;

the temperature validity detector, for receiving the temperature information from the temperature reading controller and completing validity detection; wherein the validity is detected through steps of: if the temperature value is lower than 0° C. (to be a negative value) or higher than 100° C., discarding the invalid temperature information; that is to say, the temperature measurement circuit may have a failed/invalid collection, and the temperature value obtained at this time is the negative value or super-large value; the temperature pre-analyzer, for acquiring the counting value and the current valid temperature information, and identifying validity thereof; wherein: if one of the counting value and the temperature information is invalid, the current collected information is discarded; if both are valid, both of the counting value and the temperature information are transmitted to a speed-limiting control module; the validity identification comprises: (1), judging whether the counting value matches with the timing period t1; and (2), judging whether a difference between the current valid temperature information and the last valid temperature information exceeds the threshold (for example, the difference between the current temperature and the last temperature information exceeds ±10% of the current temperature); if the counting value matches with the timing period t1 and meanwhile the difference does not exceed the threshold, both of the counting value and the current temperature information are judged to be valid; otherwise, both are judged to be invalid;

the speed-limiting control module, for configuring the initial temperature threshold after powering on, receiving the current valid temperature information and counting value, and judging whether another speed-limiting value is required to be generated combined with the current speed-limiting value; wherein: if required, the current temperature information and counting value are encapsulated and transmitted to a temperature pushing module; otherwise, the current temperature information is discarded; meanwhile, a latest valid speed-limiting value is received from a speed-limiting value validity detecting module and set as a latest speed-limiting value of the corresponding business type; before next updating of the speed-limiting value, the corresponding business will always use the speed-limiting value; "judging whether another speed-limiting value is required to be generated" particularly comprises steps of: according to the counting value, judging whether the timing trigger module normally works; if the timing trigger module normally works, determining the speed-limiting value according to the current temperature information and the initial temperature threshold, wherein:

an actual operation time of reading to the NAND Flash storage medium chips is $Cread=(T1-T2)*Cr4+Cr1$; an actual operation time of programming to the NAND Flash storage medium chips is $Cwrite=(T1-T2)*Cw4+Cw1$; a first temperature T1 of the SSD is the temperature information acquired by the temperature measurement circuit; a second temperature T2 of the SSD is the initial temperature threshold set according to the working environment temperature of the SSD; Cr1 is a basic operation time of reading to the NAND Flash storage medium chips; Cw1 is a basic operation time of programming to the NAND Flash storage medium chips; Cr4 is an average operation time change value of a NAND Flash reading command caused by a temperature change of every degree centigrade; Cw4 is an average operation time change value of a NAND Flash programming command caused by the temperature change of every degree centigrade; if the timing trigger module does not normally work, the speed-limiting value is Cr1 or Cw1;

the temperature pushing module, for receiving the current temperature information from the speed-limiting control module and transmitting to the high-temperature speed-limiting value generator module;

a speed-limiting value pushing module, for receiving the current speed-limiting value from the high-temperature speed-limiting value generator module and transmitting to the speed-limiting value validity detecting module;

the speed-limiting value validity detecting module, for detecting the current speed-limiting value through judging whether the current speed-limiting value exceeds a set threshold; wherein: if exceeding the set threshold, the current speed-limiting value is discarded, and the last speed-limiting value is used; and a channel control module, which is connected to the speed-limiting value validity detecting module, for gradually decreasing a concurrent channel number of the NAND Flash storage medium chips when the speed-limiting value exceeds a processing upper limit temperature threshold.

According to the preferred embodiment of the present invention, there are four NAND Flash channels, so as to achieve highly-efficient and mass storage of the data. Every channel can hook targets of eight NAND Flash storage medium chips; and an object of the channel control is to decrease the power consumption of the SSD. For the SSD, 60%-70% of the power consumption comes from the business operation of the NAND Flash storage medium chips. Therefore, when the speed-limiting value exceeds the processing upper limit temperature, the concurrent channel number is required to be gradually decreased, so as to achieve channel control. When exceeding the processing upper limit temperature by every ten degree centigrade, the channel number is decreased by one, until only one channel is left.

Figure 5:
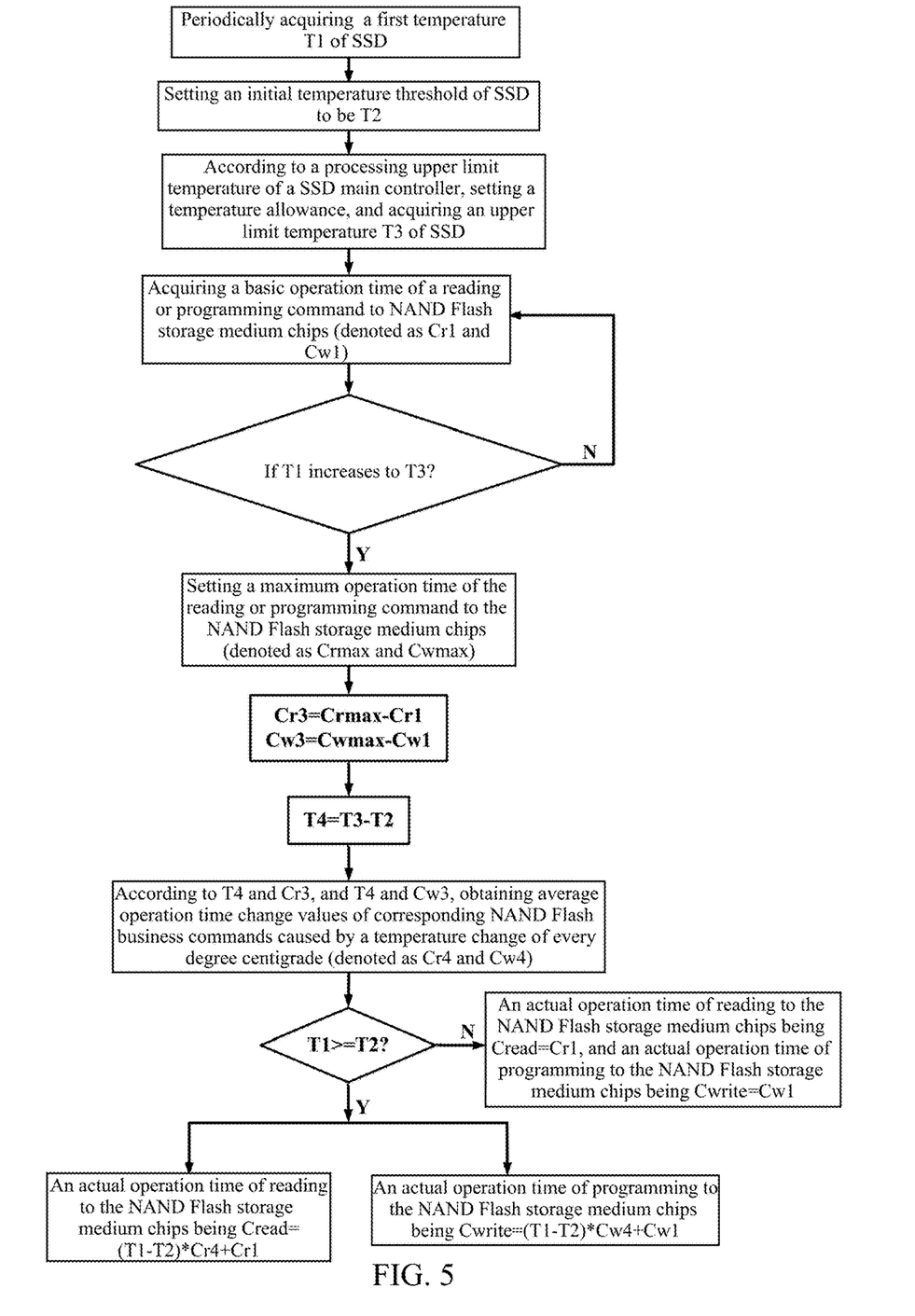
FIG. 5 is a flow chart of acquiring a speed-limiting value with a high-temperature protection method for the SSD according to the preferred embodiment of the present invention.

FIG. 5 shows a flow chart of acquiring a speed-limiting value with a high-temperature protection method for a SSD provided by the present invention, comprising steps of:

(1), after powering on, setting a timing period t1 by a timing trigger module; configuring an initial temperature threshold of the SSD by a speed-limiting control module; and, generating a start timing signal and then transmitting to the timing trigger module by a start signal generator;

(2), after receiving the start timing signal transmitted from a high-temperature speed-limiting control module by the timing trigger module, with the timing period of t1, periodically transmitting a sampled signal to a temperature measurement circuit;

(3), after receiving the sampled signal by the temperature measurement circuit, starting measuring temperature information of the SSD;

(4), with a time interval of t1, periodically acquiring the temperature information of the SSD from the temperature measurement circuit by a temperature access module;

(5), receiving the temperature information of the SSD from the temperature access module by the high-temperature speed-limiting control module, comparing with the set initial temperature threshold, and calculating a difference; and (6), according to relationships between the temperature information of the SSD and the set initial temperature threshold that Xr=(current actual temperature−initial temperature threshold)*(Crmax−Cr1)/(upper limit temperature−initial temperature threshold)+Cr1 and Xw=(current actual temperature−initial temperature threshold)*(Cwmax−Cw1)/(upper limit temperature−initial temperature threshold)+Cw1, driving a high-temperature speed-limiting value generator module to generate a latency value of a NAND Flash business command and transmitting to a main controller core by the high-temperature speed-limiting control module; configuring the latency value to a NAND Flash controller by the main controller core, and adjusting a bandwidth of the SSD; wherein: Xr represents a latency value of a NAND Flash reading command; Xw represents a latency value of a NAND Flash programming command; Crmax represents a maximum operation time of the NAND Flash reading command; and Cwmax represents a maximum operation time of the NAND Flash programming command.

According to the difference between the actual temperature of the SSD and the set initial temperature threshold, the bandwidth of the SSD is adjusted, so as to adjust an operation time period of the NAND Flash business command, thereby decreasing the SSD temperature. The bandwidth of the SSD is namely the data transmission bandwidth, and thus the SSD bandwidth is mainly determined by the data transmission bandwidth.

The setting of the timing trigger module comprises configuring the timing period t1 of the timing trigger module of the SSD. After the timing trigger module is started, the sampled signal is periodically transmitted to the temperature measurement circuit with the timing period of t1. The temperature measurement circuit is connected to the timing trigger module, for receiving the sampled signal, completing temperature measurement, and periodically transmitting the temperature information to the temperature access module of the high-temperature control manager.

For the setting of the initial temperature threshold of the SSD, when the actual temperature of the SSD reaches the set initial temperature threshold, the bandwidth of the SSD is limited. The initial temperature threshold of the SSD is set by the user and is generally the working upper limit temperature of the NAND Flash storage medium chips. The specific initial temperature threshold depends on that the used NAND Flash storage medium chips belong to industrial-grade or commercial-grade; if it belongs to industrial-grade, the upper limit is generally 0-+70° C.; if it belongs to commercial-grade, the upper limit is generally −35-+85° C.

The timing trigger module periodically transmits the sampled signal to the temperature measurement circuit, the actual temperature of the SSD is acquired from the temperature access module and compared with the set initial temperature threshold. When the actual temperature is higher than the initial temperature threshold, a difference is calculated. For example, according to the preferred embodiment, the acquired actual temperature of the SSD is T1, the set initial temperature threshold is T2, and a difference of T1−T2 is calculated; then according to the difference, the data transmission bandwidth of the NAND Flash storage medium chips is adjusted, so as to adjust the bandwidth of the SSD.

For starting of the timing trigger module, the high-temperature control manager firstly transmits a start timing signal for informing the timing trigger module to start timing, and the timing trigger module periodically generates the sampled signal after receiving the start timing signal and then transmits to the temperature measurement circuit.

For periodically acquiring the actual temperature information of the SSD, after the timing trigger module periodically transmits the sampled signal to the temperature measurement circuit, the temperature access module will periodically acquires the temperature information of the SSD from the temperature measurement circuit.

The steps of comparing the actual temperature of the SSD with the set initial temperature threshold and calculating a difference is made inside the high-temperature control manager, mainly for obtaining a temperature difference between the actual temperature of the SSD and the temperature threshold, thereby calculating the actual speed-limiting value.

The step of adjusting the bandwidth of the SSD according to the difference between the actual temperature of the SSD and the set initial temperature threshold is mainly realized through adjusting the power consumption of the SSD with the channel control technology and the operation time control technology of the NAND Flash business command, thereby adjusting the data transmission bandwidth of the NAND Flash storage medium chips.

The adjustment of the power consumption is namely the adjustment of the SSD performance, which is mainly realized through adjusting the operation time of the NAND Flash business command and the command concurrent channel number.

The adjustment of the data transmission bandwidth of the NAND Flash storage medium chips comprises adjustment of the command concurrent channel number in the NAND Flash controller, namely the channel control technology, and adjustment of the data throughput rate of the NAND Flash interface.

The command concurrent channel number in the NAND Flash controller is adjusted through steps of: according to the current actual temperature of the SSD, when the high-temperature control manager judges that the actual temperature of the SSD is higher than the processing upper limit temperature of the SSD, not adjusting the speed-limiting value, and only decreasing the command concurrent channel number of the NAND Flash storage medium chips, wherein: when exceeding the processing upper limit temperature by every ten degree centigrade, the channel number is decreased by one, until only one channel is left; if the actual temperature of the SSD is lower than the processing upper limit temperature, using all command channels, namely the command concurrent channel number is four.

The data throughput rate of the NAND Flash interface is adjusted through steps of: when the actual temperature of the SSD is higher than the set initial temperature threshold and meanwhile higher than a SSD temperature value of a last period, decreasing the data throughput rate of the NAND Flash interface; when the actual temperature of the SSD is higher than the initial temperature threshold but lower than the SSD temperature value of the last period, increasing the data throughput rate of the NAND Flash interface, thereby improving performance of the SSD; that is to say, when the SSD temperature decreases, the data throughput rate of the NAND Flash interface is required to be gradually increased to improve the bandwidth of the SSD, thereby improving the performance of the SSD; and when the actual temperature of the SSD is lower than the initial temperature threshold, not limiting the performance of the SSD.

The data throughput rate of the NAND Flash interface is adjusted through adjusting the operation time of the NAND Flash reading or programming command, namely adjusting a latency value of the NAND Flash reading or programming command, so as to control the data transmission bandwidth of the NAND Flash storage medium chips.

The operation time of the NAND Flash reading or programming command is adjusted through steps of:

(1), periodically acquiring the SSD temperature, denoted as the first temperature T1 of the SSD;

(2), according to the working environment temperature of the SSD, setting the initial temperature threshold of the SSD, denoted as the second temperature T2 of the SSD;

(3), according to the working upper limit temperature of the SSD main controller, setting the temperature allowance, and calculating the processing upper limit temperature of the SSD, denoted as the third temperature T3 of the SSD; wherein: the working upper limit temperature of the SSD main controller is determined by the specific chip processing and is generally 125° C.; for example, according to the preferred embodiment, the working upper limit temperature is 125° C., the temperature allowance is 25° C., and the processing upper limit temperature of the SSD is calculated through subtracting the temperature allowance from the working upper limit temperature, namely 125° C.-25° C.=100° C.; during adjusting, the SSD temperature cannot exceed the processing upper limit temperature; if the current high-temperature environment temperature is 70° C. and the set initial temperature threshold is also 70° C., the SSD bandwidth is adjusted from this moment, and the SSD temperature cannot exceed the processing upper limit temperature of 100° C.;

(4), respectively denoting the basic operation time of the NAND Flash reading or programming command as the first reading time Cr1 and the first programming time Cw1;

(5), when the first temperature T1 of the SSD increases to the third temperature T3 of the SSD, setting the maximum operation time Crmax of the NAND Flash reading command and the maximum operation time Cwmax of the NAND Flash programming command;

(6), according to Cr1 and Crmax, and Cw1 and Cwmax, obtaining the operation time differences of the corresponding commands during the reading or programming operation to the NAND Flash storage medium chips, respectively denoted as the third reading time Cr3 and the third programming time Cw3; that is to say, Cr3 is the difference between Crmax and Cr1, and Cw3 is the difference between Cwmax and Cw1;

(7), according to T2 and T3, obtaining the actual temperature range difference of the SSD, denoted as the first temperature difference T4 of the SSD; that is to say, T4=T3−T2;

(8), according to T4 and Cr3, and T4 and Cw3, obtaining the average operation time change values of the corresponding NAND Flash business commands caused by the temperature change of every degree centigrade, respectively denoted as the fourth reading period Cr4 and the fourth programming period Cw4 to the NAND Flash storage medium chips; that is to say, Cr4=Cr3/T4=Cr3/(T3−T2), Cw4=Cw3/T4=Cw3/(T3−T2); and (9), if T1 is larger than or equal to T2, starting adjusting the bandwidth of the SSD, calculating a difference between T1 and T2 (T1−T2), and acquiring a command type of a current operation to the NAND Flash storage medium chips, wherein the command type comprises a programming command and a reading command; combined with Cr4 and Cw4, respectively obtaining actual operation times of the NAND Flash reading and programming commands; wherein: if the current operation is a reading command, the actual operation time of reading to the NAND Flash storage medium chips is:

$$Cread=(T1-T2)*Cr4+Cr1;$$

if the current operation is a programming command, the actual operation time of programming to the NAND Flash storage medium chips is:

$$Cwrite=(T1-T2)*Cw4+Cw1;$$

if T1 is smaller than T2, stopping adjusting the bandwidth of the SSD, and adopting a basic operation time as the operation time of the NAND Flash reading or programming command, wherein: the actual operation time of reading to the NAND Flash storage medium chips is Cread=Cr1; and the actual operation time of programming to the NAND Flash storage medium chips is Cwrite=Cw1.

Figure 6:
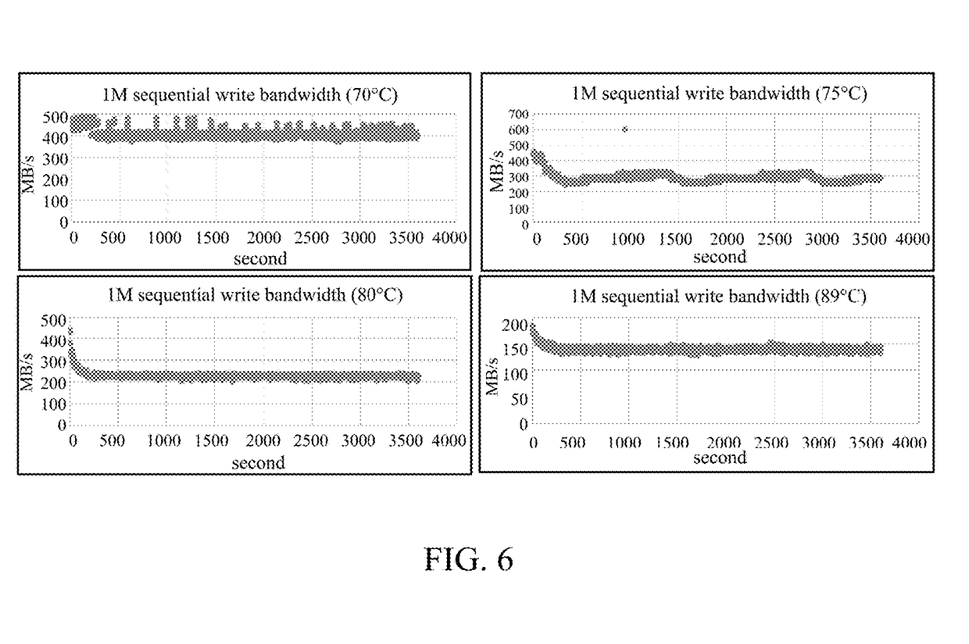
FIG. 6 is a curve diagram of a 1 M sequential write bandwidth of a SATA (serial advanced technology attachment) SSD during adjustment of power consumption according to the preferred embodiment of the present invention.

FIG. 6 shows a curve diagram of a 1 M sequential write bandwidth of the SATA SSD during adjustment of the power consumption in a changing high-temperature environment. Referring to FIG. 6, with the high-temperature protection method for the SSD provided by the present invention, when the environment temperature is 70° C., the high-temperature control manager does not really work, the curve at this time is the best write performance curve of the SSD, and the 1 M sequential write bandwidth is between 400-500 MB;

when the environment temperature is adjusted to 75° C., the high-temperature control manager works and adjusts the SSD performance to a certain extent, so as to decrease the power consumption of the SSD; and the 1 M sequential write bandwidth at this time is stable between 230-320 MB;

when the environment temperature is adjusted to 80° C., the high-temperature control manager works and further adjusts the SSD performance, so as to further decrease the power consumption of the SSD; and the 1 M sequential write bandwidth at this time is stable between 200-270 MB;

when the environment temperature is 89° C., the high-temperature control manager will frequently intervene; because the current environment temperature is close to the processing upper limit temperature, the high-temperature control manager will greatly limit the SSD performance; and the 1 M sequential write bandwidth at this time is stable between 170-220 MB.

According to the preferred embodiment, most of the temperature measurement circuit, the temperature access module, the timing trigger module, the high-temperature speed-limiting control module, and the high-temperature speed-limiting value generator module are made of digital integrated circuits, which are available chip circuit modules.

What is claimed is:

1. A high-temperature protection SSD (solid state drive), comprising a temperature measurement circuit, a host communication interface, a SSD main controller and NAND Flash storage medium chips, wherein:
   the host communication interface is connected to the SSD main controller and communicates with a host, so as to complete data transmission and command interaction between the host and the SSD main controller;

the temperature measurement circuit is connected to the SSD main controller, for collecting a temperature physical signal of the SSD and receiving a sampled signal from the SSD main controller; after receiving the sampled signal, the temperature measurement circuit converts the temperature physical signal to temperature information and transmits to the SSD main controller;

the SSD main controller is connected to the host communication interface, the temperature measurement circuit and the NAND Flash storage medium chips, for controlling data transmission and command interaction from the host to the NAND Flash storage medium chips; the SSD main controller comprises a SATA/PCIe (serial advanced technology attachment/peripheral component interconnect express) physical controller, a high-temperature control manager, a main controller core, a RAM (random access memory) and a NAND Flash controller;

the NAND Flash storage medium chips are connected to the SSD main controller, for providing storage space and access interfaces for business operations of the SSD and completing internal data storage of the host or the SSD;

the SATA/PCIe physical controller is connected to the host communication interface, the main controller core and the RAM, for receiving commands and data from the host and then distributing to the main controller core or the RAM, replying to the host commands, and transmitting data to the host;

the high-temperature control manager is connected to the temperature measurement circuit and the main controller core, for transmitting the sampled signal to the temperature measurement circuit, receiving the temperature information provided by the temperature measurement circuit, setting an initial temperature threshold, generating a latency value of a NAND Flash business command according to relationships between the temperature information and the initial temperature threshold, which is namely a speed-limiting value, and transmitting the speed-limiting value to the main controller core;

the main controller core is connected to the SATA/PCIe physical controller, the high-temperature control manager, the RAM, and the NAND Flash controller, for controlling the SATA/PCIe physical controller, the high-temperature control manager, the RAM and the NAND Flash controller to operate according to a logic business of the SSD, and configuring the speed-limiting value to the NAND Flash controller;

the RAM is connected to the main controller core, the SATA/PCIe physical controller, and the NAND Flash controller, for caching the data from the host and the internal data from the SSD; and the NAND Flash controller is connected to the main controller core, for receiving a business command from the main controller core and completing reading, writing, erasing and non-data command operations to the NAND Flash storage medium chips.

2. The high-temperature protection SSD, as recited in claim 1, wherein the temperature measurement circuit comprises:

a temperature sensor, which is connected to a temperature conversion circuit, for collecting the temperature physical signal of the SSD and transmitting to the temperature conversion circuit;

the temperature conversion circuit, which is connected to the temperature sensor and an analog-digital converter, for receiving the temperature physical signal from the temperature sensor, converting to an electric signal, and transmitting to the analog-digital converter;

the analog-digital converter, which is connected to the high-temperature control manager, the temperature conversion circuit, and a data register, for converting the electric signal to the temperature information and transmitting to the data register, and further for receiving a control signal and a clock signal from the high-temperature control manager, wherein the control signal is the sampled signal provided by a timing trigger module; and the clock signal is provided by a clock source inside the SSD main controller;

the data register, which is connected to the analog-digital converter and an internal data reading interface, for receiving the temperature information outputted by the analog-digital converter and then storing, and further for providing a data source for the internal data reading interface; and the internal data reading interface, which is connected to the data register and the high-temperature control manager, for providing a data reading interface for the high-temperature control manager and taking the temperature information out of the data register when the high-temperature control manager requires reading the temperature information.

3. The high-temperature protection SSD, as recited in claim 1, wherein the high-temperature control manager comprises:

a timing trigger module, which is connected to the temperature measurement circuit and a high-temperature speed-limiting control module, for setting a timing period t1 after powering on, receiving a start timing signal from the high-temperature speed-limiting control module, and periodically transmitting the sampled signals to the temperature measurement circuit and the high-temperature speed-limiting control module with the timing period of t1 under triggering of the start timing signal;

a temperature access module, which is connected to the temperature measurement circuit and the high-temperature speed-limiting control module, for receiving the temperature information from the temperature measurement circuit and storing in an internal register;

the high-temperature speed-limiting control module, which is connected to the temperature access module, the timing trigger module, a high-temperature speed-limiting value generator module, and the main controller core, for periodically transmitting the start timing signal to the timing trigger module, acquiring the temperature information from the temperature access module, configuring the initial temperature threshold, completing analysis of the temperature information, and judging whether the temperature information is required to be transmitted to the high-temperature speed-limiting value generator module according to analysis results, and further for transmitting the latency value provided by the high-temperature speed-limiting value generator module to the main controller core; and the high-temperature speed-limiting value generator module, which is connected to the high-temperature speed-limiting control module, for receiving the temperature information from the high-temperature speed-limiting control module, completing power consumption and performance analysis of the SSD according to the temperature information, and generating the latency value of the corresponding NAND Flash business command.

4. The high-temperature protection SSD, as recited in claim 3, wherein the high-temperature speed-limiting control module comprises:
a start signal generator, which is connected to the timing trigger module and a temperature collection counter, for generating the start timing signal and transmitting to the timing trigger module, receiving the sampled signals from the timing trigger module and then transmitting to the temperature collection counter;
the temperature collection counter, which is connected to the start signal generator and a temperature pre-analyzer, for receiving the sampled signals transmitted from the start signal generator, counting, and transmitting a counting value to the temperature pre-analyzer;
a temperature reading controller, which is connected to the temperature access module and a temperature validity detector, for acquiring the temperature information from the temperature access module and then transmitting the temperature information to the temperature validity detector;
the temperature validity detector, which is connected to the temperature reading controller and the temperature pre-analyzer, for receiving the temperature information from the temperature reading controller, detecting validity of the temperature information, discarding invalid temperature information, and transmitting valid temperature information to the temperature pre-analyzer;
the temperature pre-analyzer, which is connected to the temperature collection counter, the temperature validity detector and a speed-limiting control module, for receiving the counting value transmitted from the temperature collection counter and the current valid temperature information, and identifying validity thereof; wherein: if one of the counting value and the temperature information is invalid, the current collected information is discarded; if both are valid, both of the counting value and the temperature information are transmitted to the speed-limiting control module;
the speed-limiting control module, which is connected to the temperature pre-analyzer, a temperature pushing module, a speed-limiting value validity detecting module and the main controller core, for configuring the initial temperature threshold after powering on, receiving the current valid temperature information and counting value, and judging whether another speed-limiting value is required to be generated according to a current speed-limiting value; wherein: if required, the current temperature information and counting value are encapsulated and transmitted to the temperature pushing module; otherwise, the current temperature information is discarded; the speed-limiting control module is further for receiving a latest valid speed-limiting value from the speed-limiting value validity detecting module, setting as a latest speed-limiting value of the corresponding business command, transmitting to the main controller core, and adjusting the corresponding business to use the latest speed-limiting value; "judging whether another speed-limiting value is required to be generated" particularly comprises steps of: according to the counting value, judging whether the timing trigger module normally works; if the timing trigger module normally works, determining the speed-limiting value according to the current temperature information and the initial temperature threshold, wherein:
an actual operation time of reading to the NAND Flash storage medium chips is Cread=(T1−T2)*Cr4+Cr1; an actual operation time of programming to the NAND Flash storage medium chips is Cwrite=(T1−T2)*Cw4+Cw1; a first temperature T1 of the SSD is the temperature information acquired by the temperature measurement circuit; a second temperature T2 of the SSD is the initial temperature threshold set according to a working environment temperature of the SSD; Cr1 is a basic operation time of reading to the NAND Flash storage medium chips; Cw1 is a basic operation time of programming to the NAND Flash storage medium chips; Cr4 is an average operation time change value of a NAND Flash reading command caused by a temperature change of every degree centigrade; Cw4 is an average operation time change value of a NAND Flash programming command caused by the temperature change of every degree centigrade; if the timing trigger module does not normally work, the speed-limiting value is Cr1 or Cw1;
the temperature pushing module, which is connected to the speed-limiting control module and the high-temperature speed-limiting value generator module, for receiving the current temperature information from the speed-limiting control module and transmitting to the high-temperature speed-limiting value generator module;
a speed-limiting value pushing module, which is connected to the speed-limiting value validity detecting module and the high-temperature speed-limiting value generator module, for receiving the current speed-limiting value from the high-temperature speed-limiting value generator module and transmitting to the speed-limiting value validity detecting module;
the speed-limiting value validity detecting module, which is connected to the speed-limiting control module, the speed-limiting value pushing module and a channel control module, for detecting the current speed-limiting value through judging whether the current speed-limiting value exceeds a set threshold; wherein: if exceeding the set threshold, the channel control module is informed to limit a channel number, and the SSD uses the last speed-limiting value; otherwise, the current speed-limiting value is transmitted to the speed-limiting control module; and
the channel control module, which is connected to the speed-limiting value validity detecting module, for gradually decreasing a concurrent channel number of the NAND Flash storage medium chips when the speed-limiting value exceeds a processing upper limit temperature threshold.

5. The high-temperature protection SSD, as recited in claim 1, wherein the NAND Flash controller comprises multiple independent business channels; and each channel is able to hook targets of eight NAND Flash storage medium chips.

6. A high-temperature protection method for a SSD, comprising steps of:
(1), after powering on, setting a timing period t1 by a timing trigger module; configuring an initial temperature threshold of the SSD by a speed-limiting control module; and, generating a start timing signal and then transmitting to the timing trigger module by a start signal generator;

(2), after receiving the start timing signal transmitted from a high-temperature speed-limiting control module by the timing trigger module, with the timing period of periodically transmitting a sampled signal to a temperature measurement circuit;

(3), after receiving the sampled signal by the temperature measurement circuit, starting collecting temperature information of the SSD;

(4), with a time interval of t1, periodically acquiring the temperature information of the SSD from the temperature measurement circuit by a temperature access module;

(5), receiving the temperature information of the SSD from the temperature access module by the high-temperature speed-limiting control module, comparing with the set initial temperature threshold, and calculating a difference; and (6), according to relationships between the temperature information of the SSD and the set initial temperature threshold that Xr=(current actual temperature−initial temperature threshold)*(Crmax−Cr1)/(upper limit temperature−initial temperature threshold)+Cr1 and Xw=(current actual temperature−initial temperature threshold)*(Cwmax−Cw1)/(upper limit temperature−initial temperature threshold)+Cw1 driving a high-temperature speed-limiting value generator module to generate a latency value of a NAND Flash business command and transmitting to a main controller core by the high-temperature speed-limiting control module; configuring the latency value to a NAND Flash controller by the main controller core, and adjusting a bandwidth of the SSD; wherein: Crmax represents a maximum operation time of a NAND Flash reading command; Cr1 represents a basic operation time of the NAND Flash reading command; Cwmax represents a maximum operation time of a NAND Flash programming command; Cw1 represents a basic operation time of the NAND Flash programming command; Xr represents a latency value of the NAND Flash reading command; and represents a latency value of the NAND Flash programming command.

7. The high-temperature protection method for the SSD, as recited in claim 6, wherein the step (3) particularly comprises steps of:

(3.1), collecting a temperature physical signal of the SSD by a temperature sensor;

(3.2), converting the temperature physical signal of the SSD to an electric signal by a temperature conversion circuit;

(3.3), converting the electric signal to the temperature information and transmitting to a data register by an analog-digital converter; and (3.4), storing the temperature information by the data register.

8. The high-temperature protection method for the SSD, as recited in claim 6, wherein: after receiving the temperature information of the SSD from the temperature access module, the step (5) further comprises steps of:

detecting validity of the temperature information through a temperature validity detector, and discarding invalid temperature information; and acquiring a counting value of the sampled signals and the current valid temperature information through a temperature pre-analyzer, and identifying validity thereof; if one of the counting value and the temperature information is invalid, discarding the current collected information; if both are valid, transmitting both of the counting value and the temperature information to the speed-limiting control module.

9. The high-temperature protection method for the SSD, as recited in claim 6, wherein: the step of "adjusting a bandwidth of the SSD" in the step (6) particularly comprises steps of: adjusting a command concurrent channel number in the NAND Flash controller, and adjusting a data throughput rate of a NAND Flash interface; wherein:

the command concurrent channel number in the NAND Flash controller is adjusted through steps of: according to the current actual temperature of the SSD, when a high-temperature control manager judges that the current actual temperature of the SSD is higher than a processing upper limit temperature of a SSD main controller, not changing a speed-limiting value and meanwhile decreasing the concurrent channel number in the NAND Flash controller; otherwise, not changing the concurrent channel number in the NAND Flash controller; and the data throughput rate of the NAND Flash interface is adjusted through steps of: when the actual temperature of the SSD is higher than the set initial temperature threshold and meanwhile higher than a SSD temperature value of a last period, decreasing the data throughput rate of the NAND Flash interface; when the actual temperature of the SSD is higher than the initial temperature threshold but lower than the SSD temperature value of the last period, increasing the data throughput rate of the NAND Flash interface, thereby guaranteeing performance of the SSD; and when the actual temperature of the SSD is lower than the initial temperature threshold, recovering to a default data throughput rate of the NAND Flash interface.

10. The high-temperature protection method for the SSD, as recited in claim 9, wherein: the data throughput rate of the NAND Flash interface is adjusted through adjusting an operation time of the NAND Flash reading or programming command, namely adjusting a NAND Flash latency value, comprising steps of:

when a first temperature T1 of the SSD increases to a third temperature T3 of the SSD, setting the maximum operation time Crmax of the NAND Flash reading command and the maximum operation time Cwmax of the NAND Flash programming command; wherein: the first temperature T1 of the SSD is the temperature information acquired by the temperature measurement circuit; and the third temperature T3 of the SSD is an upper limit temperature of the SSD;

calculating a third reading time Cr3 and a third programming time Cw3 to NAND Flash storage medium chips through formulas of Cr3=Crmax−Cr1 and Cw3=Cwmax−Cw1;

calculating a difference of an actual temperature range of the SSD, namely a first temperature difference T4 of the SSD, through a formula of T4=T3−T2; wherein the second temperature T2 of the SSD is the initial temperature threshold set according to a working environment temperature of the SSD;

calculating average operation time change values of the NAND Flash commands caused by a temperature change of every degree centigrade, respectively denoted as a fourth reading period Cr4 and a fourth programming period Cw4 to the NAND Flash storage medium chips, namely:

$Cr4=Cr3/T4=Cr3/(T3-T2);$ $Cw4=Cw3/T4=Cw3/(T3-T2);$ if T1 is larger than or equal to T2, starting adjusting the bandwidth of the SSD, calculating a difference between T1 and T2, and acquiring a business type of a current operation to the NAND Flash storage medium chips, wherein the business type comprises a programming business and a reading business; combined with Cr4 and Cw4, respectively obtaining actual operation times of the NAND Flash reading and programming commands; wherein: if the current operation is a reading command, the actual operation time of reading to the NAND Flash storage medium chips is:

$Cread=(T1-T2)*Cr4+Cr1;$ if the current operation is a programming command, the actual operation time of programming to the NAND Flash storage medium chips is:

$Cwrite=(T1-T2)*Cw4+Cw1;$ if T1 is smaller than T2, stopping adjusting the bandwidth of the SSD, and adopting the basic operation time as the operation time of the NAND Flash reading or programming command, wherein: the actual operation time of reading to the NAND Flash storage medium chips is Cread=Cr1; and the actual operation time of programming to the NAND Flash storage medium chips is Cwrite=Cw1.

* * * * *